(12) United States Patent
Andrews

(10) Patent No.: US 8,108,268 B1
(45) Date of Patent: Jan. 31, 2012

(54) METHOD, COMPUTER PROGRAM PRODUCT, AND SYSTEM FOR MAKING A DEAL AND A DONATION ACROSS A NETWORK

(76) Inventor: Alison Andrews, Glen Cove, NY (US)

( * ) Notice: Subject to any disclaimer, the term of this patent is extended or adjusted under 35 U.S.C. 154(b) by 0 days.

(21) Appl. No.: 13/160,923

(22) Filed: Jun. 15, 2011

(51) Int. Cl.
*G06Q 30/00* (2012.01)

(52) U.S. Cl. .................. 705/26.61; 705/329; 705/26.62; 705/26.63; 705/26.64; 705/26.7

(58) Field of Classification Search ........ 705/26.1–27.2, 705/329
See application file for complete search history.

(56) References Cited

U.S. PATENT DOCUMENTS

| | | | |
|---|---|---|---|
| 6,542,875 B1 * | 4/2003 | Mulvihill et al. ............... | 705/35 |
| 6,873,968 B2 | 3/2005 | Ehrlich et al. | |
| 7,395,230 B2 * | 7/2008 | Hermreck et al. .............. | 705/31 |
| 2001/0032134 A1 | 10/2001 | Hardesty | |
| 2002/0120539 A1 * | 8/2002 | Price ............................... | 705/35 |
| 2004/0181468 A1 * | 9/2004 | Harmon et al. ................. | 705/29 |
| 2006/0167790 A1 | 7/2006 | Gould et al. | |
| 2010/0174616 A1 | 7/2010 | Steed | |
| 2010/0191587 A1 * | 7/2010 | Duerr ........................... | 705/14.7 |
| 2011/0153449 A1 * | 6/2011 | Hite .............................. | 705/26.3 |
| 2011/0191264 A1 * | 8/2011 | Inghelbrecht et al. ........ | 705/400 |

OTHER PUBLICATIONS

"5 Painless Ways to Donate to a Charity Five ways to give to charity painlessly Give it away—but not to the taxman" Nina Montagu-Smith. The Daily Telegraph. London (UK): Aug. 4, 2009. p. 26. Retrieved via ProQuest.*

* cited by examiner

*Primary Examiner* — Michael Misiaszek
(74) *Attorney, Agent, or Firm* — Lyman H. Moulton, Esq.

(57) ABSTRACT

The disclosure enables a buyer to beat an advertised price and make a deal and a donation via a network by specifying at least one of a product and a service desired for purchase by the buyer, calculating a price range from a real-time network search of a comparable advertised product or service and making an offer to at least one registered seller based on a graded price from the price range comprising the seller's asking price. Furthermore, the disclosure transacts a deal between the buyer and a seller and transfers a difference between the graded price and the seller's asking price to a charity or a third party of the buyer's choice. Also, a loss difference to the seller between the seller's asking price and a graded price may be donated to a charity of the seller's choosing from the seller's proceeds and a difference with the graded price.

16 Claims, 10 Drawing Sheets

METHOD, COMPUTER PROGRAM PRODUCT, AND SYSTEM FOR MAKING A DEAL AND A DONATION ACROSS A NETWORK

BACKGROUND OF THE INVENTION

Amounts vary by country and region but by some accounts the cost to feed a child for one day in impoverished countries is only 25 to 56 cents. At least one organization reports that $10 may pay for food for three days at a hospital for an expectant mother. In some countries, training a midwife may cost as little as $125 a month for 18 months. A trained midwife may then save mothers and babies for many years to come. Furthermore, for only a $190 donation to some charities, a rickshaw ambulance may be obtained to rush patients to hospitals in countries throughout the world where motorized ambulatory care is financially out of the question.

Charitable donations are critical to improving the human condition for many of the world's peoples. However, the amount and the number of charitable donations may be fewer in a weak economy because there may be less discretionary income to spread around. However, in many households around the world there is still enough pocket change to clutter desktops and purses. Still yet, some buyers with deep pockets continue to buy at pre-recessionary levels but may not have the time it takes to meaningfully contribute to charitable causes.

National and world-wide corporations may step in to donate to charity and make a showing as a good corporate citizen. Many corporations are willing to contribute on a matching basis what employees or others may donate to a worthy cause. On an often smaller scale, an individual may want to donate to charity and then share the experience with their network of friends and associates. This may in turn increase the number of contributors if not the size of contributions from many others.

However, most present charitable giving opportunities and methods cater to large and disparate donation amounts. Many charitable giving opportunities and methods of getting money from a donor to an end cause remain disjointed, uncoordinated and vulnerable to fraud. Therefore, there is an obvious and long felt need for an efficient way to allow an individual or an organization to donate any amount of money at any time to others less fortunate.

SUMMARY OF THE INVENTION

A method to beat an advertised price and make a deal and a donation via a network of voice, data, internet, wireless and satellite technologies is disclosed. The method includes specifying to an administrator at least one of a product and a service desired for purchase by a buying party via the network. The method also includes calculating a graded price range from a real-time network search for at least one of a comparable product and service advertised by a plurality of selling parties. The method additionally includes making an offer from a buying party escrow to at least one registered selling party, the offer based on a graded price from a graded price range comprising the seller's asking price relevant to the buying party's specification. Furthermore, the method includes transacting a deal between the buying party and one of the selling parties based on an acceptance of the buying party's offer by the selling party and transferring a difference between the graded price and the selling party's advertised price directly to a third party via the network. In other words, a potential savings difference to the buyer between the graded price and the selling party's advertised price may be donated to a charity of the buyer's choice. Also, as later explained in detail, a loss difference between a selling party's asking price or solicited price and a graded price may be donated to a charity of the selling party's choosing.

Therefore, the selling party's proceeds between the selling party's asking price and a graded price from the graded price range may also be donated directly to a charity of the selling party's choice. Escrow funds placed with a fiduciary from a buyer's funds in an amount at least equal to a registered selling party's asking price is made and an amount equal to the graded price may be paid to the selling party from the escrow and the escrow amount minus the graded price may be paid to the third party via the network.

A computer program product comprising a computer readable medium having computer useable instruction codes executable to perform operations for beating an advertised price and making a deal and a donation across a network of voice, data, internet, wireless and satellite technologies is disclosed. The computer program product includes a set of instruction codes for calculating a graded price range from a real-time network search for at least one of a product and service advertised by selling parties via the network. The computer program product also includes instruction codes for making an offer from a buying party escrow to at least one registered selling party for a comparable product and service, the offer based on a graded price from the calculated price range comprising an asking price of the seller. The computer program product additionally includes a set of instruction codes for transacting a deal between the buying party and the registered selling party based on an acceptance of the buying party's offer by the selling party. The computer program product may further include a set of instruction codes for transferring via the network from a buyer's escrow directly to a charity a difference between the graded price and the selling party's solicited price.

A disclosed system for beating an advertised price and making an ecommerce transaction and donation across a network of voice, data, internet, wireless and satellite technologies is disclosed. The method includes an administrator configured to communicate across the network an offer from a buyer's escrow to a seller for one of a product and a service solicited by the seller and to communicate from the seller to the buyer an acceptance of a buyer's offer for one of the product and service. The system also includes a transacted deal repository comprising a price history of all accepted offers for all prior buyers organized in a taxonomy of products and services including a seller condition for one of the product and service. Additionally, the system includes a search and calculate module configured to calculate a graded price range and a graded price for one of a comparable product and a service from a real-time cumulative network search and the transacted deal repository. Furthermore, the system includes a transaction module configured to donate a difference between the graded price and a price solicited by the seller to a charity of the buyer's choice, the buyer's offer based on the graded price range.

BRIEF DESCRIPTION OF THE DRAWINGS

Throughout the description, similar reference numbers may be used to identify similar or same elements in multiple figures.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the claims.

Everyone likes the feeling of making a good deal and getting the best bargain for their money. The disclosure allows individual buyers or buying parties of multiple individuals to share that good deal euphoria with a charity of their choice. Furthermore, many people also like the feeling of donating to a charitable organization and so allowing them to feel the euphoria of making a good deal and to also feel the euphoria of donating to a charity at the same time is doubly rewarding and an incentivizing aspect of the present disclosure.

A corporation may want to price match a buying party's offer and donate the difference to charity to make a showing as a good community citizen. An individual may likewise want to or be willing to pay a higher price for a product or service enabling the difference to go charity and tell their network of friends/associates and increase charitable giving for their favorite cause.

The terms 'buying party' and 'buyer' are synonymously used throughout the present disclosure. Similarly, the terms 'selling party' and 'seller' are synonymous herein. A buying party or a buyer may be an individual, a family, a social group, a business or a group or conglomerate of businesses and the like. Similarly, a seller may be an individual, a family, a social group, a business or a group of conglomerate businesses and the like. Also throughout the present disclosure, the phrase "make a deal and a donation" may be defined as "make a savings and a donation." The term 'search,' in regards to the standard usage of an internet search engine may also be regarded as a 'locate' or 'find' function precedent to the negotiation for the sales of goods and services via the internet. A 'registered' seller includes sellers who have registered with an administrator of the disclosed method at a website or through any other method. Registered sellers are a subset of sellers advertising a product or service via the network. The term 'asking price' may represent an amount of money a selling party is willing to take in exchange for goods or services advertised openly via the network or solicited only to the buying party and/or to a third party in confidence. The term 'graded price' as used throughout the present disclosure may describe an average price or a calculated average price but may also describe other statistically significant calculated prices as detailed herein. Therefore the term 'calculated price range' used throughout may comprise several or many graded price ranges as determined by the statistical model used to fit the advertised prices found to match the buyer's specifications.

Figure 1:
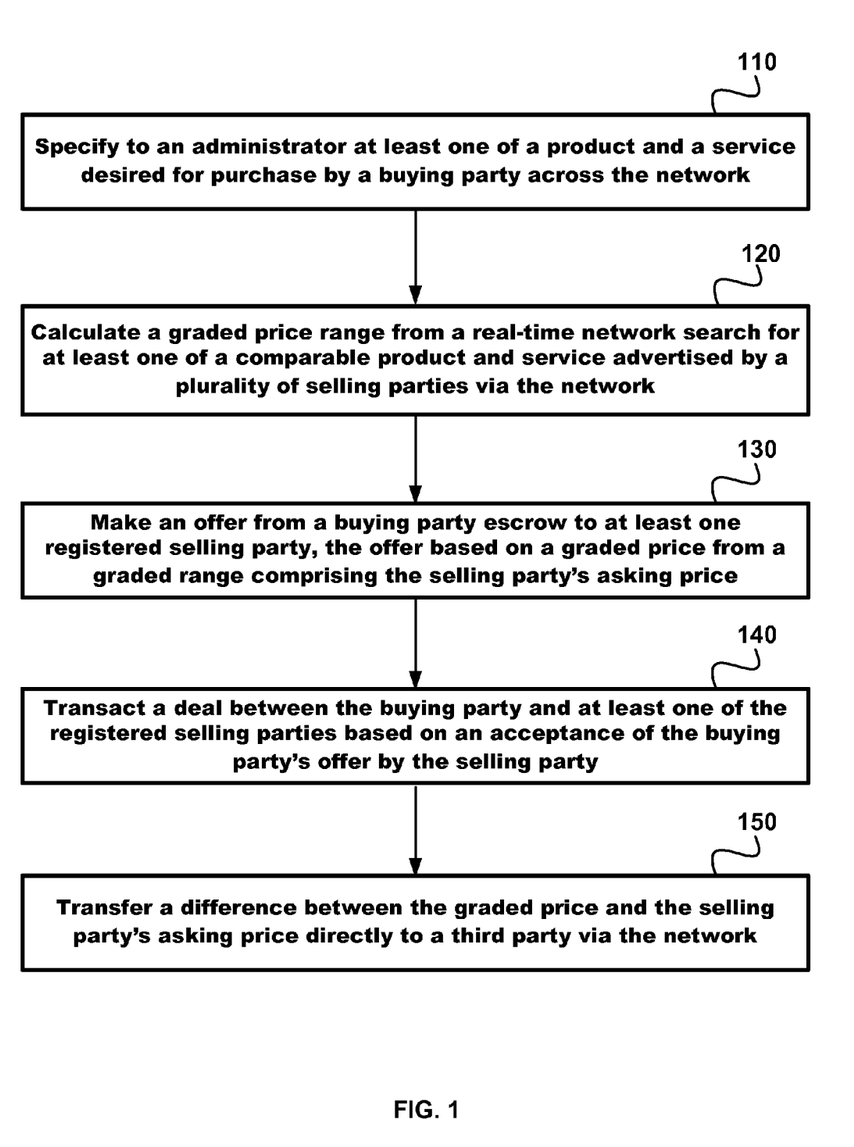
FIG. 1 is a flow chart of a method for beating an advertised price and making a deal and a donation via a network of voice, data, internet, wireless and satellite technologies in accordance with an embodiment of the present disclosure.

FIG. 1 is a flow chart of a method for beating an advertised price and making a deal and a donation across a network of voice, data, internet, wireless and satellite technologies in accordance with an embodiment of the present disclosure. The method includes specifying 110 to an administrator at least one of a product and a service desired for purchase by a buying party across the network. The method also includes calculating 120 a graded price range from a cumulative real-time network search for at least one of a comparable product and service advertised by a plurality of selling parties. The method additionally includes making 130 an offer from a buying party escrow to at least one of the selling parties, the offer based on a graded price from a graded price range comprising a registered seller's asking price and a graded price range relevant to the buyer's specification. Furthermore, the method includes transacting 140 a deal between the buying party and at least one of the selling parties based on an acceptance of the buying party's offer by the selling party and transferring 150 a difference between the graded price and the selling party's advertised asking price directly to a third party across the network. An embodiment includes a savings difference to the buyer or a loss difference to the seller in a transaction where the buying party's offer may also be affected by a coupon.

Several graded price ranges may be calculated per the present disclosure where each graded price range may be relevant to the buyer's specifications. For instance, one price range may include digital cameras of certain digital imaging density and zoom lens specifications, etc which are material to price. Another price range may include digital cameras of a certain high end name brand which include all of the aforementioned features but command higher prices due to their name brand and trademark goodwill. If name brand is not important to the buyer, he or she may choose a less expensive price range and therefore be able to use the less expensive graded price in negotiations. On the other hand, where a buyer is willing to pay more for a certain name brand, he or she may choose the more expensive price range and therefore be able to use the more expensive graded price in negotiations with registered sellers. The graded price ranges may be determined statistically as explained below in relation to FIG. 2.

A third party may include a charity, an non-profit institution, a religious organization, a fiduciary, a private individual and a beneficiary of a buying party or a selling party's choosing. A fiduciary may hold funds for the buyer or the seller up and until the buyer or seller makes a withdrawal for business or personal reasons. The fiduciary may therefore include a bank, a trust, an accountant or an attorney etc. A buyer may therefore accumulate savings realized through the disclosed method in a retirement account or a college fund etc.

A real-time cumulative network search comprises searching the network at a time the buyer specifies to the administrator at least one of a product and a service desired for purchase. A plurality of comparable product and service prices are accumulated or stored in a persistent memory for calculation and electronic display to at least one of the buying party.

The specification by the buyer that may affect a higher selling price for a product include its age, condition, availability, its useful remaining life or its prior usage, a well-maintained appearance, an availability of the product and the like. A specification that may affect a higher selling price for a service may include the performance of a custom, preferred or specialty service, an exigent service, an availability for the service or an ongoing transactional opportunity for one or both of the selling and buying parties. In other words, conditions of the seller's product and/or services may create a higher selling price and therefore a greater differential between the seller's advertised product and/or service and the buyer's offer based on a calculated range from a real-time search of the network.

The cumulative real-time search of the network to locate comparable products, goods or services may be performed by an individual for the administrator or the search may be performed through software, hardware and methods known to those learned in the art. The search may also operate from a mixture of algorithmic and human input. The search may also be performed directly by the administrator or its assigns or the search may be contracted to a third party entity comprising search engine means. Once a product or service is located through a search of the network, the buyer may then start the negotiation process disclosed herein with a selling party to purchase the product or service. The buying party may also input an advertised price, a coupon to beat, or specify a product by using bar code and/or coding either via mobile phone or bar code reader or other means known to persons of ordinary skill in the art.

Figure 2:
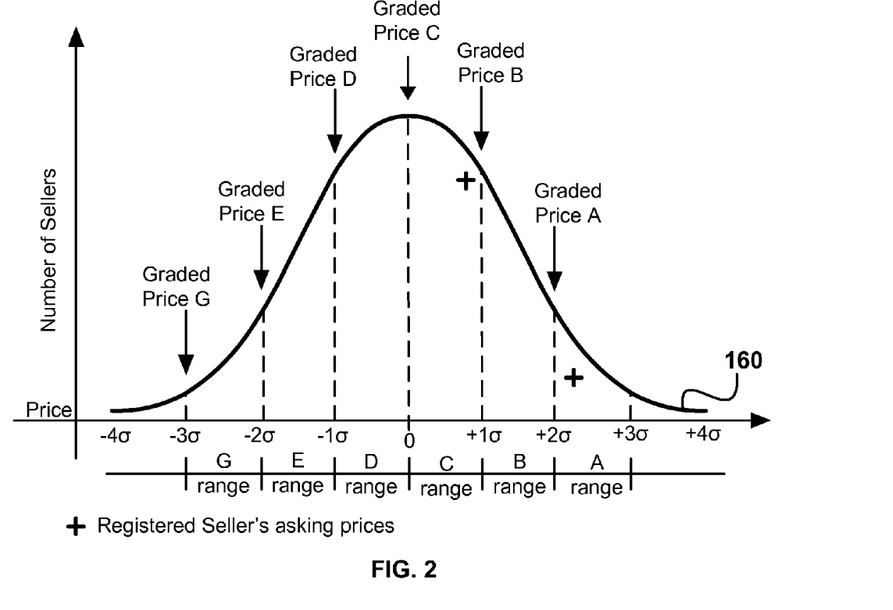
FIG. 2 depicts a calculated price range from a real-time cumulative search of the network for a comparable product or service in accordance with an embodiment of the present disclosure.

FIG. 2 depicts a calculated price range from a real-time cumulative search of the network for a comparable product or service in accordance with an embodiment of the present disclosure. Calculating a price range may include calculating a statistical mean and a standard deviation from the mean in a normal distribution 160 of advertised prices. A six sigma price range may also be calculated as shown including a negative 3 sigma range below the mean or average selling price and a positive 3 sigma range above the mean. All advertised prices under the curve and to the right of the $+2\sigma$ ordinate, also known as the graded price A, comprise the A range. Similarly, all advertised prices under the curve and to the right of the $+1\sigma$ ordinate, known as the graded price B, comprise the B range and so forth. A buyer may offer the graded price A for a registered seller's product or service priced in the A range depicted with a bold cross. The buyer may also offer the graded price B but it is statistically less significant than graded price A in relation to the seller's asking price. The buyer may also make an offer equal to graded price C for a registered seller's product or service priced in the C range (also depicted with a bold cross). Returning to the digital camera prices explanation above, the seller's asking price in graded range A may be for a name brand camera and the seller's asking price in graded range C for a generic brand camera.

Calculating a plurality of graded prices rather than a single average price gives the buyer more negotiating power with registered seller's products or services with features commanding higher prices in the market. However, if a buyer offers the seller's full asking price there may be no savings to transfer to a third party or to donate to charity. The graded prices and respective price ranges allow the buyer to take into account features which may justify higher prices and yet beat an asking price based on a statistically relevant lower price. The multiple graded price ranges and respective graded prices are particularly applicable in negotiations involving larger sums of money. For instance, sales of automobiles and large ticket items where the difference between a single average price and an advertised price or asking price may be large enough to prevent a buyer and a seller reaching middle ground. The term 'graded price' is used to describe a spectrum of calculated or suggest prices but other terms may be used in embodiments of the present disclosure to indicate an evaluation or calculation of average prices between any number of higher prices and lower prices.

Though a normal and continuous distribution (Gaussian) 160 is used to depict a calculated price range, other statistical distributions may be used in embodiments of the present disclosure including but not limited to discrete distributions. The present disclosure takes advantage of the bargaining power a buyer has in presenting competing prices to the seller to get the seller to lower their prices. Presenting an average price for a product or service gives the buyer leverage in offering a reasonable purchase price to the seller. The leverage is especially helpful in online transactions where a buyer may easily purchase from another seller at a lower price because there is no travel time and expense for researching prices. However, in embodiments of the disclosure, the buyer may choose not to disclose the average price or a graded price in the calculated price range for any arbitrary reason held by the buyer.

An embodiment of the method for making a deal and a donation across a network may further include making an escrow with a fiduciary of a buying party's funds for at least one of the product and the service. The amount of money put in escrow may be equal to a registered selling party's price and an amount equal to the graded price is payable to the selling party from the escrow. The escrow amount minus the graded price is therefore payable to the third party via the network. The buyer's offer and escrow may comprise cash, credit, a financial instrument, a barter exchange and a combination thereof. A buyer wishing to offer a barter product or service may also offer a difference between the value of products and/or services in cash or credit in the disclosed method. The disclosed method may also occur automatically and electronically based on the acceptance of the buying party's offer and escrow by the selling party.

Figure 3:
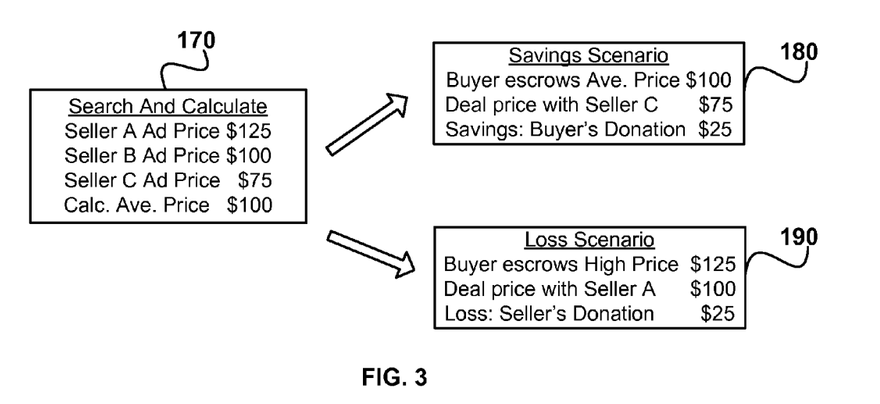
FIG. 3 is a flow chart of a method for making a deal and a donation across a network comprising a Buyer's donation and a Seller's donation in accordance with an embodiment of the present disclosure.

FIG. 3 is a flow chart of a method for making a deal and a donation across a network comprising a buyer's donation and a seller's donation in accordance with an embodiment of the present disclosure. A buyer is presented with the information 170 of the highest price of $125 (Seller A) and the lowest price of $75 (Seller C) and the calculated average price or the graded price of $100 (Seller B as well). In a commodities market where a condition of the product may not be material to its advertised price, a buyer wishing to make a bargain purely on financial grounds may make an escrow for an amount equal to the lowest price and make an offer to Seller C. However, a buyer wishing to share in his or her good fortune in finding a bargain may make an escrow for an amount equal to the average price and make an offer to Seller C. Upon transacting a deal with seller C for less than the advertised average price, the buyer may feel the satisfaction and euphoria that comes with making a good deal. The savings difference between the buying party's escrow of the calculated average price (graded price) or the seller's asking price and the transacted deal at seller C's price is donated directly to a charity of the buyer's choice since it is the buyer's money from escrow going to charity. In other words, the buyer beat seller's A and seller's B's advertised prices, made a good deal with seller C and donated to a charity of his or her choosing all at the same time in the present disclosure. The buyer may therefore combine the satisfaction felt from beating an advertised price and making a good deal with the euphoria of donating savings to a charity or making a deposit to a child's college fund or his/her retirement account.

In a market for specialty and custom products or services sold based on a condition of the product or service, a buyer may wish to purchase from seller A at a higher price. Seller A may be made aware of the calculated average price (graded price) at the buyer's discretion. Seller A is willing to transact a deal with the buyer in order to have the difference with his or her selling price donated from their proceeds directly to a charity of the seller's choosing. The buyer is willing to transact with seller C at a higher price than the calculated average (graded price) because he or she is getting a product or service with a condition favorable to the buyer. Seller A may be a corporation or an entity wishing to gain favor with a group of buyers such as the ecologically minded or wishing to gain favor with a certain demographic of buyers or wishing to gain favor with a local contingency for instance. The buyer is also participating in a transaction that results in a donation to charity and may feel a measure of euphoria therefrom. Therefore, the buyer and the seller both benefit directly and indirectly from the transaction.

Therefore, a buyer's offer and escrow of $100 may be based on the calculated average price and thus represents a fair deal to both the buyer and the seller with or without a higher valued condition of the product or the service sought. The Savings Scenario 180 depicts a 'deal' price of $75 and a savings of $25 to the buyer which the buyer may donate electronically to charity. Also, the Loss Scenario 190 depicts a seller's loss of $25 between the selling party's advertised or asking price and a deal price at the $100 calculated average price (graded price) which may be donated to a charity of the selling party's choice. The seller has agreed through the administrator to donate the difference with the calculated average price of $100 or $25 to a charity of the seller's choice. The buyer pays the full $125 knowing that the $25 difference will go to a charity. The convenience of an electronic donation combined with the ability to make many micro-donations to a charity make the present disclosure a logical choice to philanthropic parties.

Figure 4:
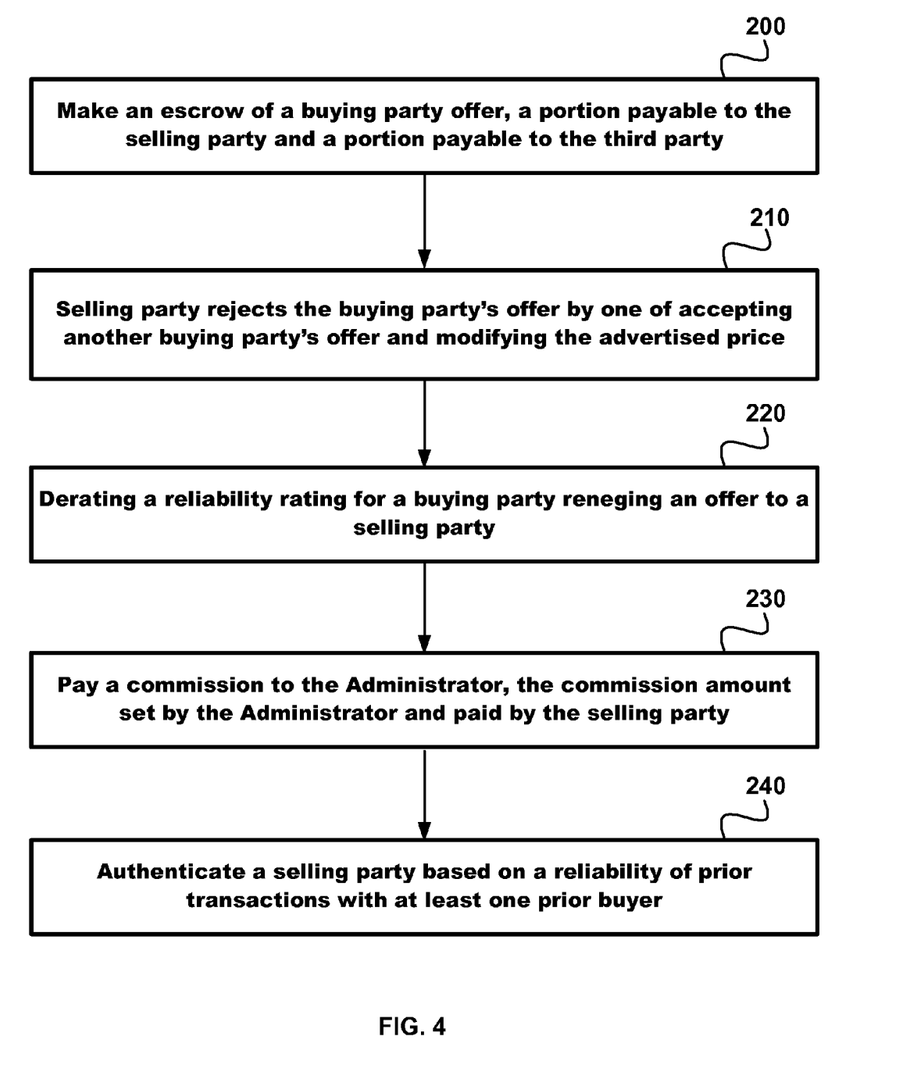
FIG. 4 is a flow chart of an embodiment of a method for beating an advertised price and making a deal and a donation in accordance with the present disclosure.

FIG. 4 is a flow chart of an embodiment of a method for beating an advertised price and making a deal and a donation in accordance with the present disclosure. The embodiment includes 200 making an escrow with a fiduciary of a buying party offer, a portion payable to the selling party and a portion payable to the third party. The escrow gives the buying party additional leverage for offering a cash purchase. The escrow also allows for an automated transaction when buyer conditions are met as disclosed herein. The buyer's escrow also makes it easier for the selling party to accept the buying party's offer and therefore complete a transaction resulting in a donation to a charity. Without the escrow, a buyer may experience purchase regret and attempt to make the purchase without donating to a charity. The escrow enables the buyer or the seller to respectively make a donation of their savings or loss without having to twice think about their donation and change their mind in a weak moment. The escrow may be handled by the administrator or may be deposited with another fiduciary party.

Returning to FIG. 4, an embodiment for the method of making a deal and a donation across a network may also include the selling party rejecting 210 the buying party's offer by one of accepting another buying party's offer and modifying the advertised price. When performed electronically and automatically, the rejecting of a buyer's offer frees up the seller to accept another buyer's offer. Likewise, the rejection of a buying party's offer allows the buyer to transact with another selling party. The disclosed method may further comprising reneging a buying party's offer to the selling party and derating 220 a reliability rating of the reneging buying party. A buying party which has never reneged an offer may attain the highest possible reliability rating in the present disclosure. A derated reliability rating for a buyer puts sellers on notice that the buyer may renege again. A seller may therefore decide to take a lower offer from a buyer who has a higher reliability rating. The method for making a deal across a network further includes the buying party paying 230 a commission to the administrator of the method, a commission amount set by the administrator and paid by the selling party. The commission may be computed as a percentage of the total transaction price or it may be computed as a percentage of the calculated average selling price. The commission may be paid from the buyer's escrow of it may be paid separately at a periodic billing cycle from one of the buyer and the seller. The commission allows the administrator to cover operating costs and where appropriate to make an acceptable profit administering the disclosed method. The disclosed method may further include authenticating 240 a selling party based on a reliability of prior transactions with at least one prior buyer within the disclosed system. A buyer may also be authenticated by credit history and credit score.

Figure 5:
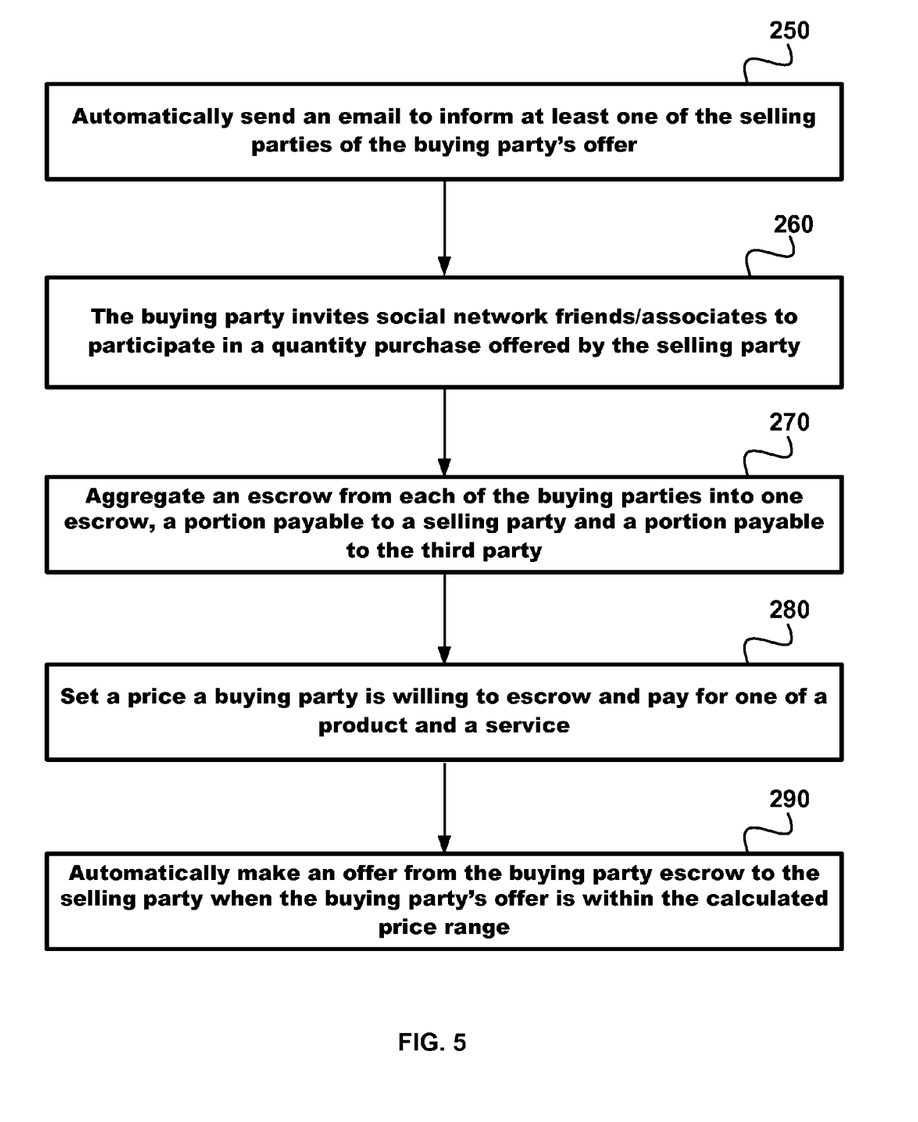
FIG. 5 is a flow chart of an embodiment of a method for beating an advertised price and making a deal and a donation in accordance with the present disclosure.

FIG. 5 is a flow chart of an embodiment of a method for beating an advertised price and making a deal and a donation in accordance with the present disclosure. The embodiment includes automatically sending 250 an email to inform at least one of the selling parties of the buying party's offer. Likewise, an email notice may be sent to a buying party informing them of a seller's acceptance of their offer. The website for administering the disclosed method may also indicate and communicate transactions between buyers and sellers but only when a user is authenticated by the administrator. The disclosed embodiment also includes inviting 260 a plurality of social network friends or associates of the buying party to participate in a quantity purchase of one of the product and the service offered by the selling party and aggregating 270 an escrow from each of the buying parties into one quantity purchase escrow, the quantity purchase escrow payable to one of the selling parties and the third party. Additionally, the embodiment allows a buying party setting 280 a price they are willing to escrow and pay for one of a product and a service by automatically making an offer to the selling party when the buying party's price or offer (from escrow) is within the calculated price range. Application software may be used in automatically making 290 an offer from the buying party escrow to the selling party when the buying party's escrow is within the calculated price range. The application software may be run at the administrator's website or it may be run at one of the buyer's or the seller's computer/server and/or an internet service provider's servers.

Figure 6:
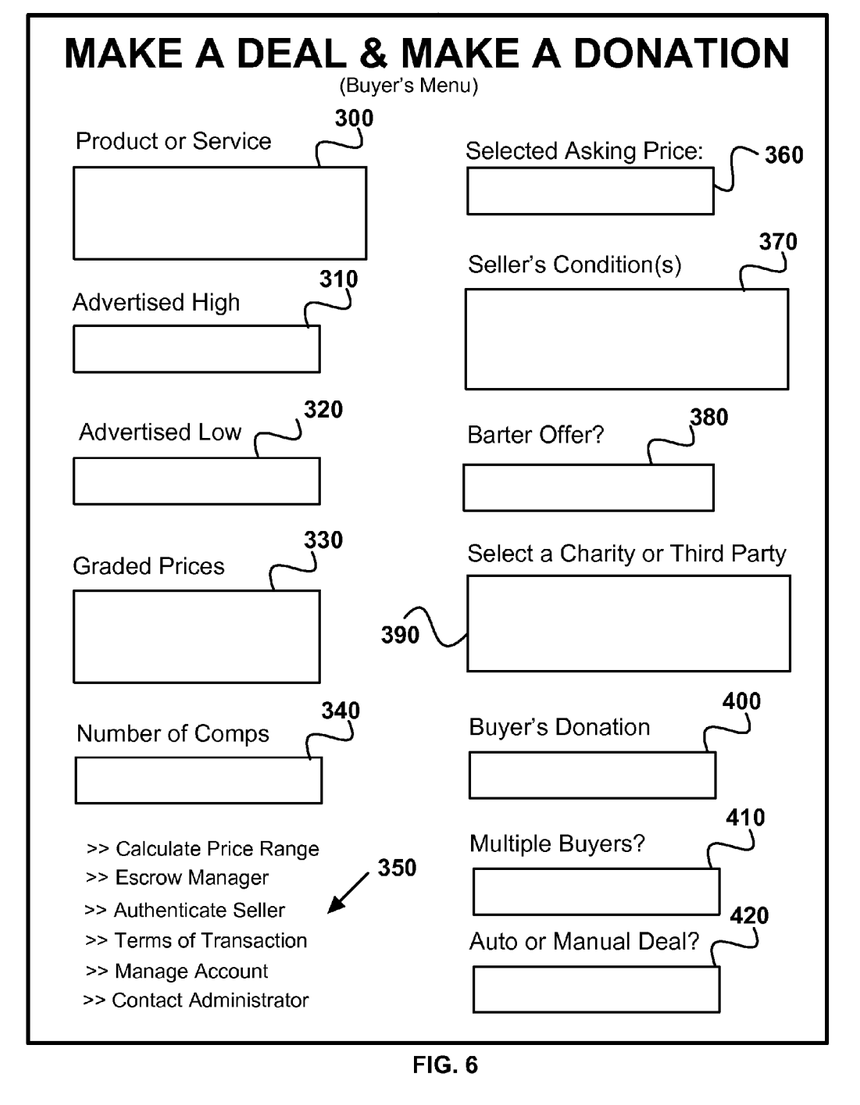
FIG. 6 depicts a donating buying party's display of a transaction between a buyer and a seller in accordance with an embodiment of the present disclosure.

FIG. 6 depicts a donor buying party's display of a transaction between a buyer and a seller in accordance with an embodiment of the present disclosure. The screen may display a buying party's offer, the calculated price range, a low and a high calculated price, terms of payment, a plurality of transaction details and the selling party's advertised price on a single webpage available to both parties through the network. A buying party's screen may include text entry boxes for the buyer to specify to the administrator of the disclosed method a product or a service 300, an advertised high price 310, an advertised low price 320, graded prices 330, a number of comparable products or services found in the search 340, a number of website navigation buttons 350, a seller's asking price chosen by the buyer 360, a selling party's conditions of a product and/or a service 370, a barter offer 380, a charity or other third party selection window 390, a buyer's donation amount 400, a multiple buyers option 410 and an Auto or Manual Deal selection button 420. The website navigation buttons 350 may automatically direct a user upon activation to a page for calculating a price range, escrow manager, authenticate the Seller, Terms of the Transaction, Manage an Account and contact the administrator.

Figure 7:
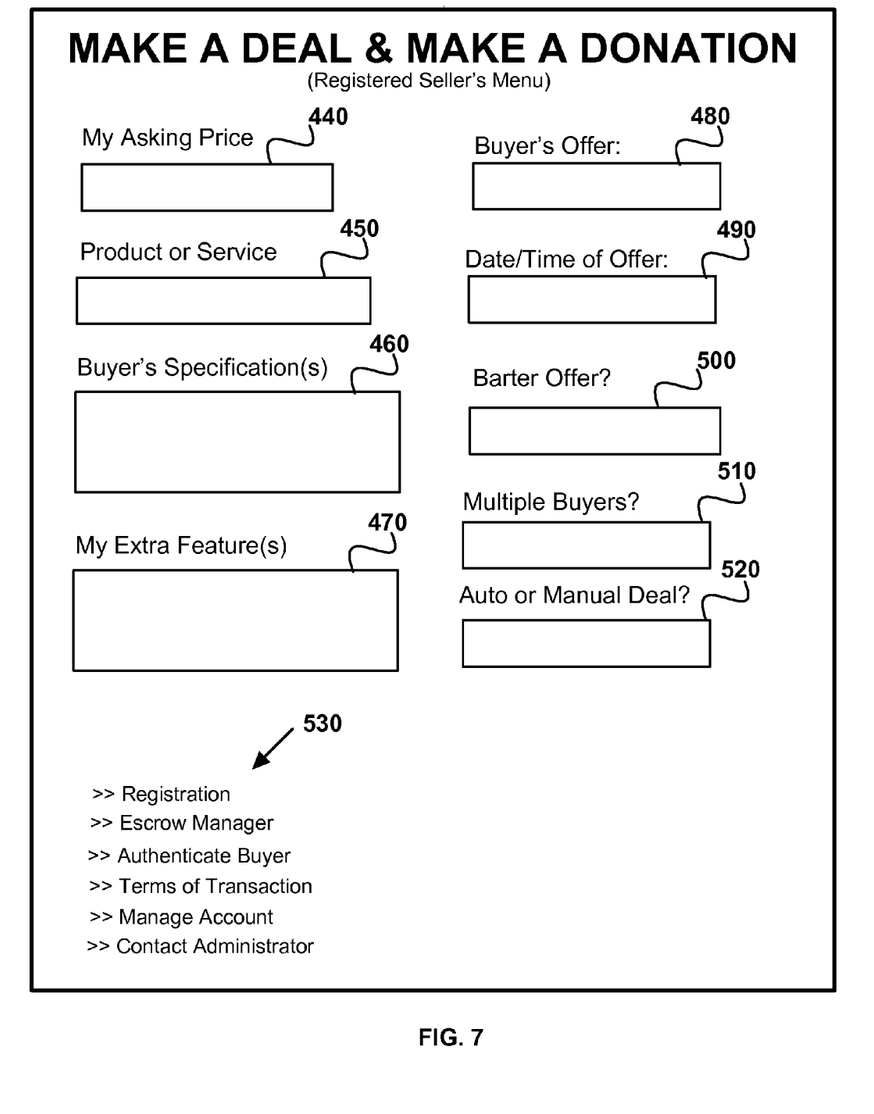
FIG. 7 depicts a registered selling party's display of a transaction between a buyer and a seller in accordance with an embodiment of the present disclosure.

FIG. 7 depicts a registered selling party's display of the transaction between a buyer and a seller in accordance with an embodiment of the present disclosure. The display is also known as the seller's electronic menu and includes an entry 440 for the seller to enter his or her asking price. The display also includes an entry 450 for the seller to enter specifications concerning their product or service. The menu additionally includes a display 460 of the buyer's specifications for the product or service the buyer desires to purchase. The menu allows the seller to enter 470 extra distinguishing features that in the seller's opinion are material to their asking price. Furthermore, the menu displays other information helpful to the registered seller such as the buyer's offer 480, the date and/or time of the offer 490, whether the buyer's offer includes a barter 500, whether or not there are multiple buyers 510 and whether or not the deal to be transacted will be automatic or manual 520. The displayed menu may also comprise a number of website navigation buttons 530 including but not limited to registration, escrow manager, authenticate buyer, terms of transaction, manage account and contact administrator.

Figure 8:
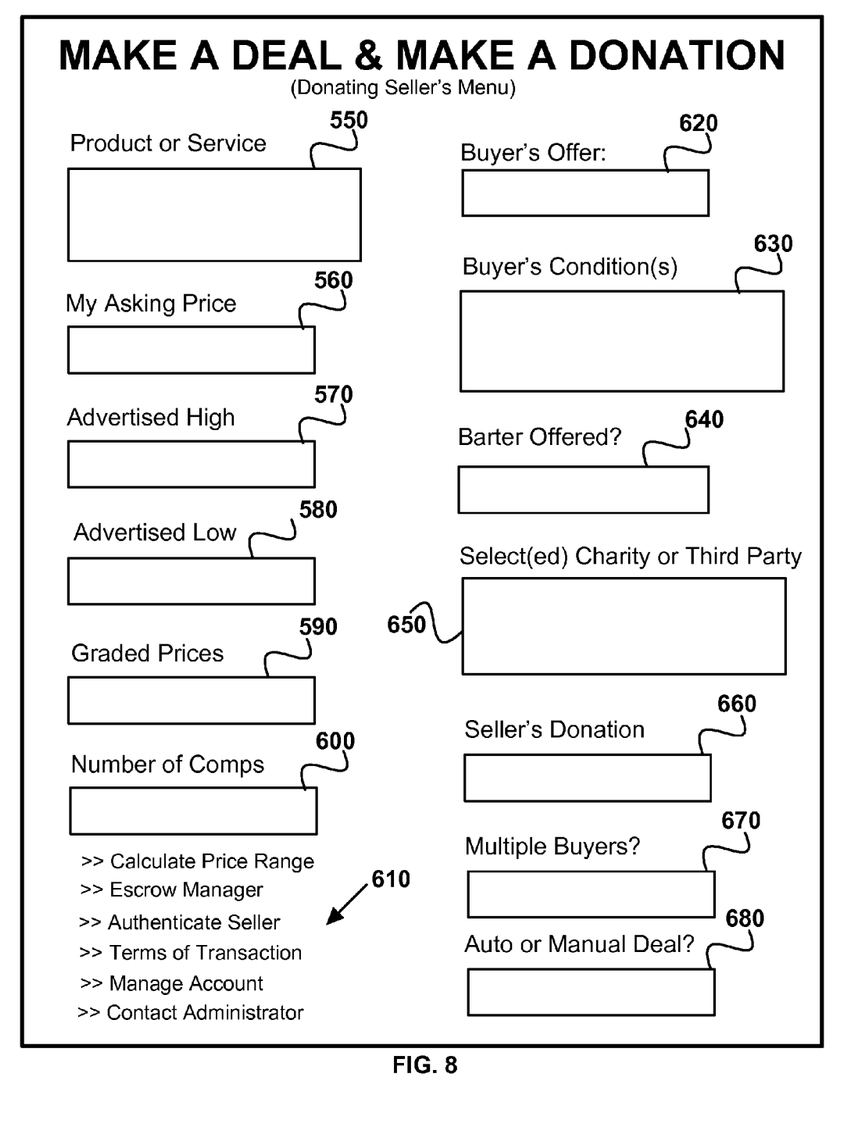
FIG. 8 depicts a donating selling party's display of a transaction between a buyer and a seller in accordance with an embodiment of the present disclosure.

FIG. 8 depicts a donor selling party's display of the transaction between a buyer and a seller in accordance with an embodiment of the present disclosure. A donating selling party's screen may include a display of the seller's specification (spec) of a product or a service 550, the seller's asking price 560, an advertised high price 570, an advertised low price 580, graded prices 590, a number of comparable products or services found in the search 600, a number of website navigation buttons 610, a buyer's offer 620, the buying party's specifications of a product and/or a service 630, whether or not a bartered offer 640 is involved, a charity or other third party selection and/or entry window 650, a seller's donation amount 660, a multiple buyers display 670 and an Auto or Manual Deal display 680. The charity selection window 650 may either display a third party or a charity the seller has entered or it may allow the seller to choose a third party or a charity from a list. The seller chooses the recipient of their proceeds from a transaction with a buyer in this embodiment (see the description of FIG. 3 above in regards to the donation of a seller's loss). The website navigation buttons 610 automatically direct the seller upon activation to a page for calculating a graded price range, a page for an escrow manager, a page to authenticate the buying party, a page for Terms of the Transaction, a page to Manage an Account and a page to Contact the Administrator.

Figure 9:
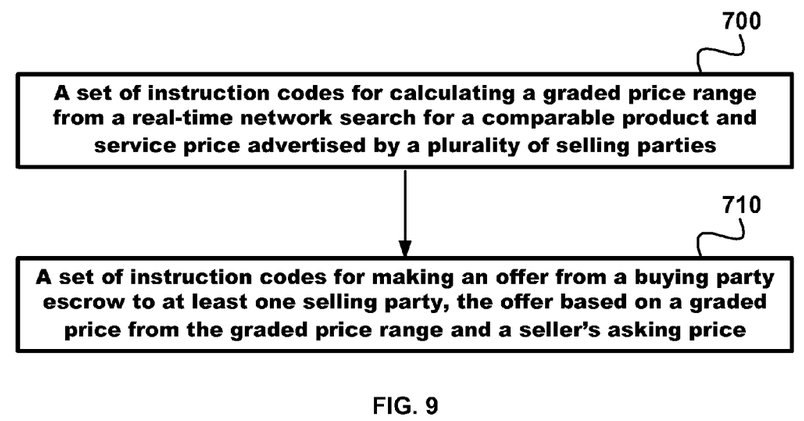
FIG. 9 is a flow chart of a computer program product comprising instruction codes for beating an advertised price and making a deal and a donation across a network of voice, data, internet, wireless and satellite technologies in accordance with an embodiment of the present disclosure.

FIG. 9 is a flow chart of a computer program product comprising instruction codes for beating an advertised price and making a deal and a donation across a network of voice, data, internet, wireless and satellite technologies in accordance with an embodiment of the present disclosure. The computer program product comprises a computer readable medium having computer useable instruction codes executable to perform operations as disclosed. The computer program product includes a set of instruction codes for calculating 700 a graded price range from a real-time network search for at least one of a product and service advertised by selling parties via the network. The computer program product also includes instruction codes for making 710 an offer from a buying party escrow to at least one registered selling party for a comparable product and service, the offer based on a graded price from the calculated price range.

Figure 10:
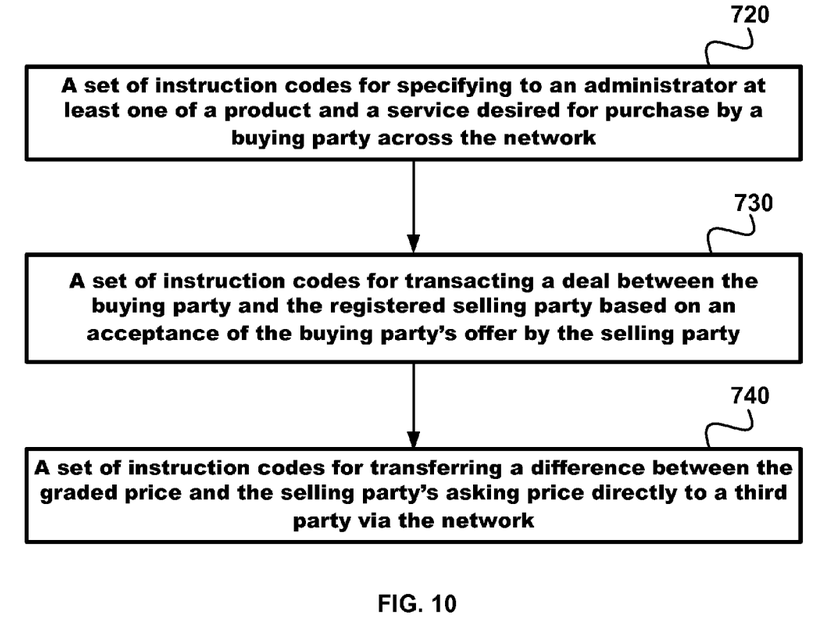
FIG. 10 is a flow chart of an embodiment for a computer program product comprising instruction codes for beating an advertised price and making a deal across a network in accordance with the present disclosure.

FIG. 10 is a flow chart of a computer program product comprising instruction codes for beating an advertised price and making a deal across a network in accordance with an embodiment of the present disclosure. The embodiment includes a set of instruction codes for specifying 720 to an administrator at least one of a product and a service desired for purchase by the buying party across the network. The computer program product may also include a set of instruction codes for transacting 730 a deal between the buying party and the registered selling party based on an acceptance of the buying party's offer by the selling party. The computer program product may additionally include a set of instruction codes for transferring 740 via the network from a buyer's escrow directly to a charity a difference between the graded price and the selling party's asking price directly to a third party via the network.

Figure 11:
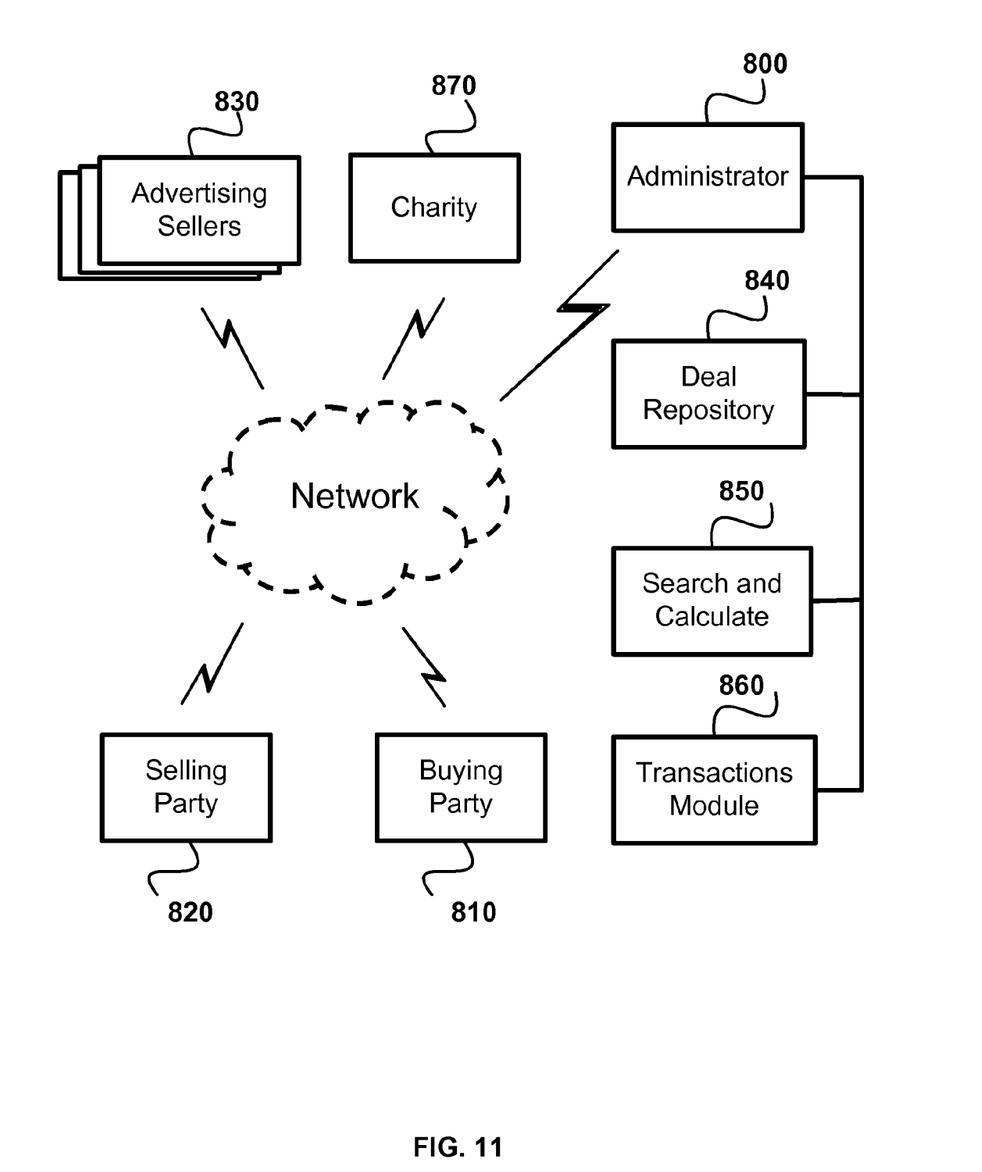
FIG. 11 is a block diagram of a system for beating an advertised price and making a deal and a donation across a network of voice, data, internet, wireless and satellite technologies in accordance with an embodiment of the present disclosure.

FIG. 11 is a block diagram of a system for beating an advertised price and making a deal and a donation across a network of voice, data, internet, wireless and satellite technologies in accordance with an embodiment of the present disclosure. The disclosed system allows a user to make an ecommerce transaction and a donation across a network and includes an administrator 800 configured to communicate across the network an offer from a buyer's escrow 810 to a seller 820 for one of a product and a service solicited by the seller 820 and to communicate from the seller 820 to the buyer 810 an acceptance of a buyer's offer for one of the product and service. Other advertising sellers 830 are depicted vending their products and/or services online through the network. The system also includes a transacted deal repository 840 comprising a price history of all accepted offers for all prior buyers organized in a taxonomy of products and services including a seller condition for one of the product and service. The taxonomy may include for instance categories of products such as automobiles, clothing, shoes, personal digital assistants (PDA) including phones, electronic tablets, etc), sporting goods, tools etc. The taxonomy of services may include dental and health services, legal and accounting services, handyman services etc. The disclosed system may additionally include a search and calculate module 850 configured to calculate a graded price range and a graded price for one of a comparable product and a service from a real-time cumulative network search and the transacted deal repository. Furthermore, the system includes a transaction module 860 configured to donate a difference between the graded price and the seller's solicited price directly to a charity 870 of the buyer's choice via the internet, the buyer's offer based on the graded price range.

Figure 12:
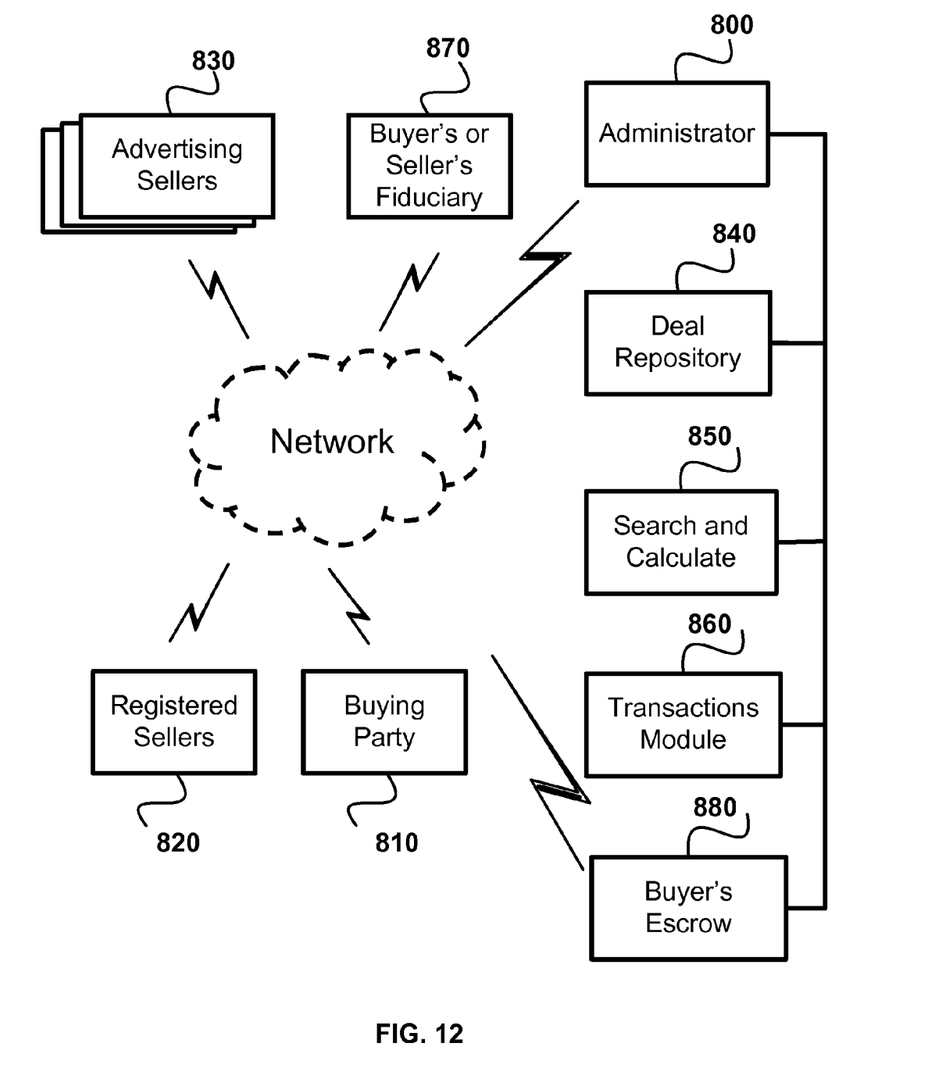
FIG. 12 is a block diagram of an embodiment for a system for beating an advertised price and making a deal and a donation including a buyer's escrow in accordance with the present disclosure.

FIG. 12 is a block diagram of an embodiment for a system for beating an advertised price and making a deal and a donation including a buyer's escrow in accordance with the present disclosure. The buyer's or seller's fiduciary 870 may hold funds for the buyer or the seller up and until the buyer or seller makes a withdrawal for business and/or personal reasons. The fiduciary 870 may therefore include a bank, a trust, an accountant or an attorney etc. A buyer or a seller may therefore accumulate savings realized through the disclosed method in a retirement account or a college fund and the like via the fiduciary 870. The buyer's escrow 880 may be directly managed by the Administrator 800 as depicted or it may be managed by another fiduciary party via the internet. Funds transferred directly to a charity or a fiduciary are customarily transferred electronically using domestic and international account routing numbers.

The ever growing use of the internet and the disclosed method, computer program product and system makes possible charitable giving on any scale. Hundreds of micro donations of cents and single macro donations of tens or hundreds of thousands of dollars from the savings and loss of ecommerce transactions over the internet involving the purchase of clothes, food, sports equipment, cars and even homes are made possible by the present disclosure. Therefore, a seller may subscribe to the website or want to create a website of their own using the disclosed method or a buyer will want to use the method/website to buy things and be willing to pay the difference to charity. A private seller may also want to price match with a buyer and then donate the difference to charity. The calculated price range from a real-time search of the internet allows buyers and seller to transact a 'reasonable' price and donate the savings or loss to charity.

Therefore the present disclosure solves the obvious and long felt need for an efficient way to allow an individual or an organization to donate any amount of money at any time to others less fortunate. The present disclosure comprises a method, computer program product and system to enable charitable giving of money and barter goods seamlessly from a donor to an end cause quickly and efficiently.

Although the operations of the method(s) and the computer program product herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims included herein and their equivalents.

What is claimed is:

1. A method for making a deal across a network of voice, data, internet, wireless and satellite technologies, comprising:

a) specifying to an administrator at least one of a product and a service desired for purchase by a buying party via the network;
   b) calculating, by a computer on the network, a graded price range from a real-time network search for at least one of a product and service advertised by a plurality of selling parties via the network;
   c) making an offer from a buying party escrow to a registered selling party for a comparable product and service, the offer based on a graded price in a graded price range comprising an asking price of the selling party;
   d) transacting a deal between the buying party and the registered selling party based on an acceptance of the buying party's offer by the selling party; and
   e) transferring a difference between the graded price and the selling party's asking price directly to a third party via the network;
   wherein transferring a difference between the graded price and the selling party's asking price directly to a third party via the network comprises donating the difference between the graded price and the selling party's asking price directly to a charity of the selling party's choice.

2. The method for making a deal across a network of claim 1, wherein a real-time network search comprises:

a) searching the network according to a buyer's specification at a time the buyer specifies to the administrator at least one of a product and a service desired for purchase; and
   b) accumulating a plurality of comparable product and service prices for 25 calculation and display to at least one of the buying party and the selling party.

3. The method for making a deal across a network of claim 1, wherein making an offer from a buying party escrow to one of the selling parties further comprises making the escrow with a fiduciary from a buyer's funds, an escrow amount at least equal to a registered selling party's asking price, an amount equal to the graded price payable to the selling party from the escrow and the escrow amount minus the graded price payable to the third party from the escrow via the network.

4. The method for making a deal across a network of claim 1, wherein the buyer's offer comprises one of cash, credit, a financial instrument, a barter exchange and a combination thereof.

5. The method for making a deal across a network of claim 1, wherein transacting a deal between the buying and the selling parties occurs automatically and electronically based on the acceptance of the buying party's offer by the selling party.

6. The method for making a deal across a network of claim 1, further comprising the selling party rejecting the buying party's offer by one of accepting another buying party's offer and modifying the advertised price.

7. The method for making a deal across a network of claim 1, further comprising reneging a buying party's offer to the selling party and derating a reliability rating of the reneging buying party.

8. The method for making a deal across a network of claim 1, further comprising paying a commission to the administrator, a commission amount set by the administrator and paid by the selling party.

9. The method for making a deal across a network of claim 1, further comprising authenticating a selling party based on a reliability of prior transactions with at least one prior buyer.

10. The method for making a deal across a network of claim 1, further comprising automatically sending an email to inform at least one of the selling parties of the buying party's offer.

11. The method for making a deal across a network of claim 1, further comprising:
   a) inviting a plurality of social network friends of the buying party to participate in a quantity purchase of one of the product and the service offered by the selling party; and
   b) aggregating an escrow from each of the buying parties into one quantity purchase escrow, the quantity purchase escrow payable to one of the selling parties and the third party.

12. The method for making a deal across a network of claim 1, further comprising:
   a) setting a price a buying party is willing to escrow and pay for one of a product and a service; and
   b) automatically making an offer from a buying party escrow to the selling party when the buying party's offer is within the calculated price range.

13. The method for making a deal across a network of claim 2, wherein a buyer's specification comprises at least one of an age of the product, a condition of the product, a useful remaining life of the product, a prior usage of the product, a well maintained appearance, an availability of the product, a preferred service, a custom service, an exigent service, an availability of the service and an ongoing transactional opportunity for both the buying party and the selling party.

14. A computer program product comprising a computer readable storage medium having computer useable instruction codes executable to perform operations for making a deal across a network of voice, data, internet, wireless and satellite technologies, the operations of the computer program product comprising:
   a) specifying to an administrator at least one of a product and a service desired for purchase by the buying party across the network;
   b) for calculating a graded price range from a real-time network search for at least one of a product and service advertised by a plurality of selling parties via the network; and
   c) making an offer from a buying party escrow to at least one registered selling party for a comparable product and service, the offer based on a graded price from the graded price range comprising an asking price of the selling party;
   d) transacting a deal between the buying party and the registered selling party based on an acceptance of the buying party's offer by the selling party; and
   e) transferring a difference between the graded price and the selling party's asking price directly to a third party via the network;
   wherein transferring a difference between the graded price and the selling party's asking price directly to a third party via the network comprises donating the difference between the graded price and the selling party's asking price directly to a charity of the selling party's choice.

15. The computer program product of claim 14, wherein transacting a deal between the buying and the selling party further comprises displaying a buying party's offer, the calculated price range, a low and a high graded price, terms of payment, a plurality of transaction details and the selling party's advertised price on a single webpage available to both parties through the network.

16. A system for making an e-commerce transaction across a network, comprising:
   an administrator configured to receive a specification of at least one of a product and a service desired for purchase by a buyer across the network communicate across the network an offer from the buyer's escrow to a seller for one of a product and a service solicited by the seller and to communicate from the seller to the buyer an acceptance of a buyer's offer for one of the product and service;
   a search and calculate hardware module configured to calculate a graded price range comprising an asking price of the seller and a graded price for one of a comparable product and a service from a real-time network search; and
   a transaction module configured to transact a deal between the buyer and the seller based on an acceptance of the buyer's offer by the seller; and donate a difference between the graded price and the seller's asking price directly to a charity of the seller's choice, the buyer's offer based on the graded price range.

* * * * *